May 17, 1960     E. C. WATT ET AL     2,936,913
APPARATUS FOR UNLOADING SUGAR CANE AND THE LIKE
Filed Nov. 19, 1957     3 Sheets-Sheet 1
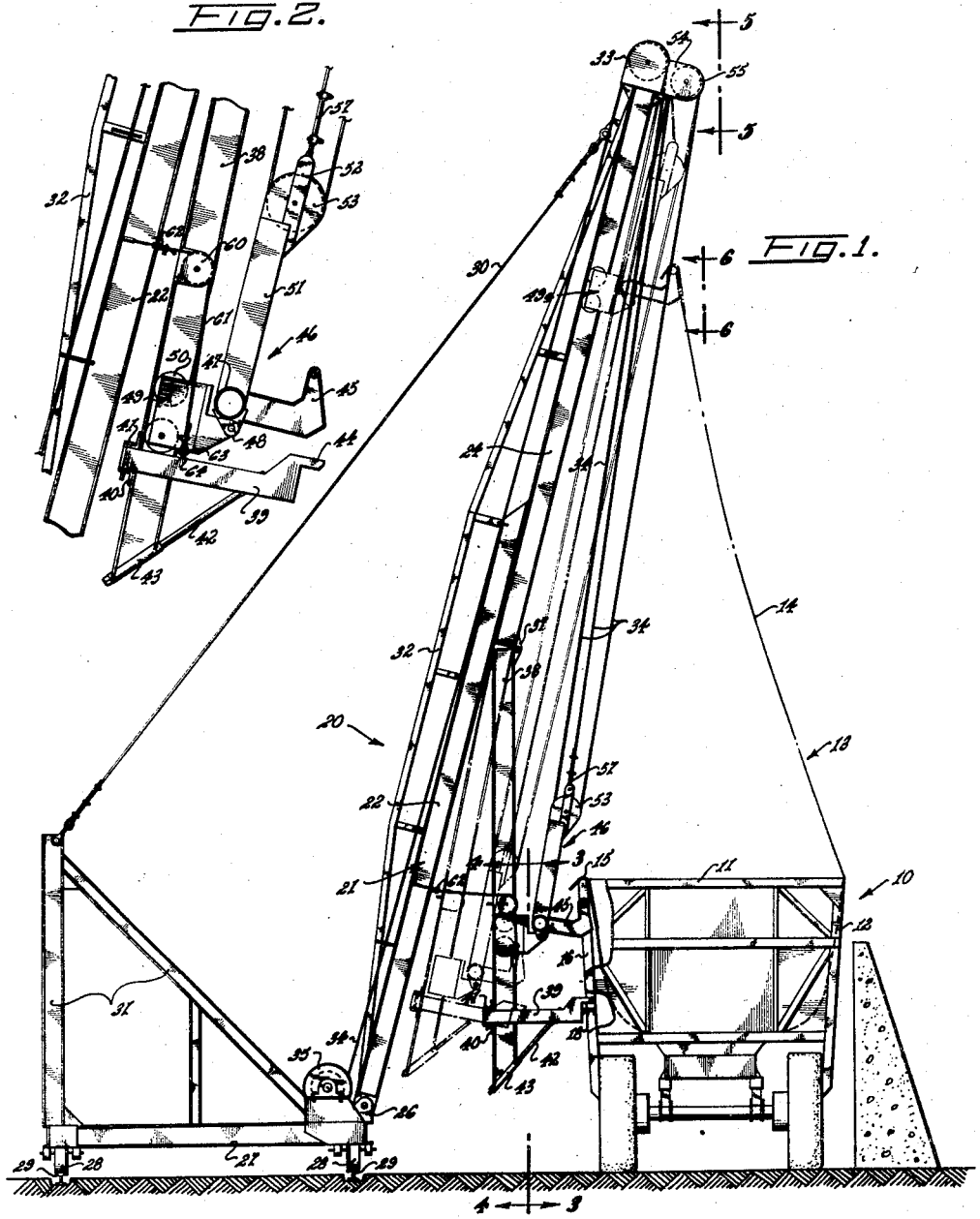
EVERETT C. WATT
LYNN A. WATT
INVENTOR.
BY
ATTORNEY May 17, 1960  E. C. WATT ET AL  2,936,913
APPARATUS FOR UNLOADING SUGAR CANE AND THE LIKE
Filed Nov. 19, 1957  3 Sheets-Sheet 2
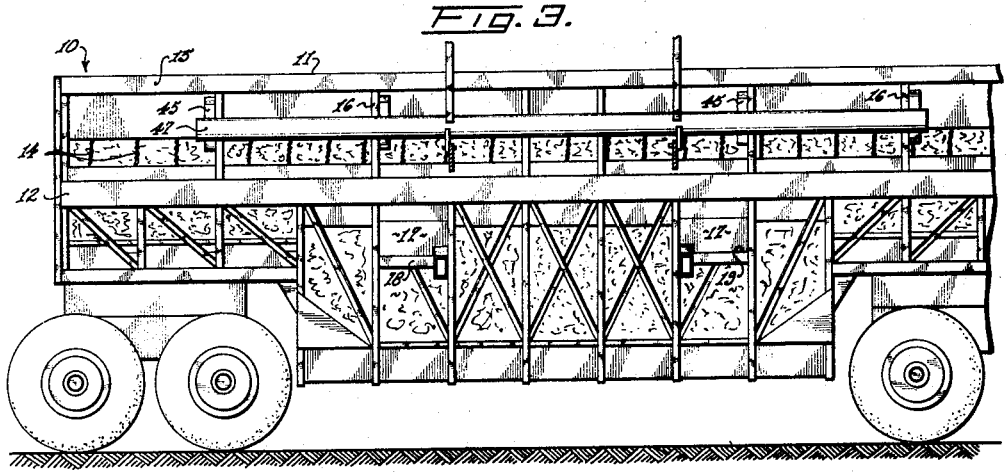
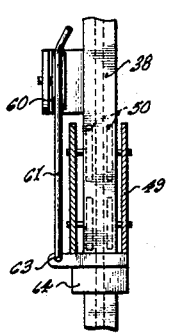
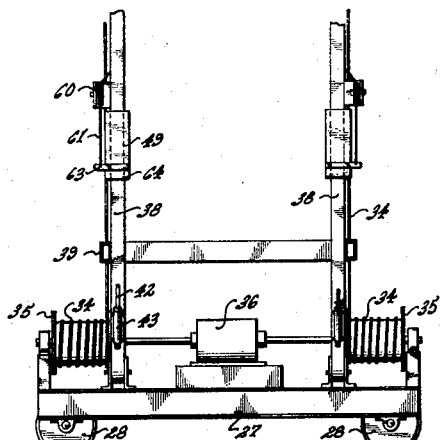
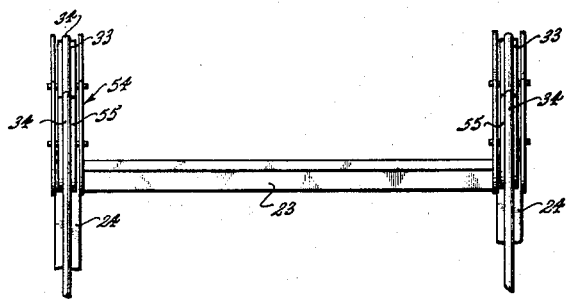
EVERETT C. WATT
LYNN A. WATT
INVENTOR.
BY
ATTORNEY May 17, 1960 E. C. WATT ET AL 2,936,913
APPARATUS FOR UNLOADING SUGAR CANE AND THE LIKE
Filed Nov. 19, 1957 3 Sheets-Sheet 3
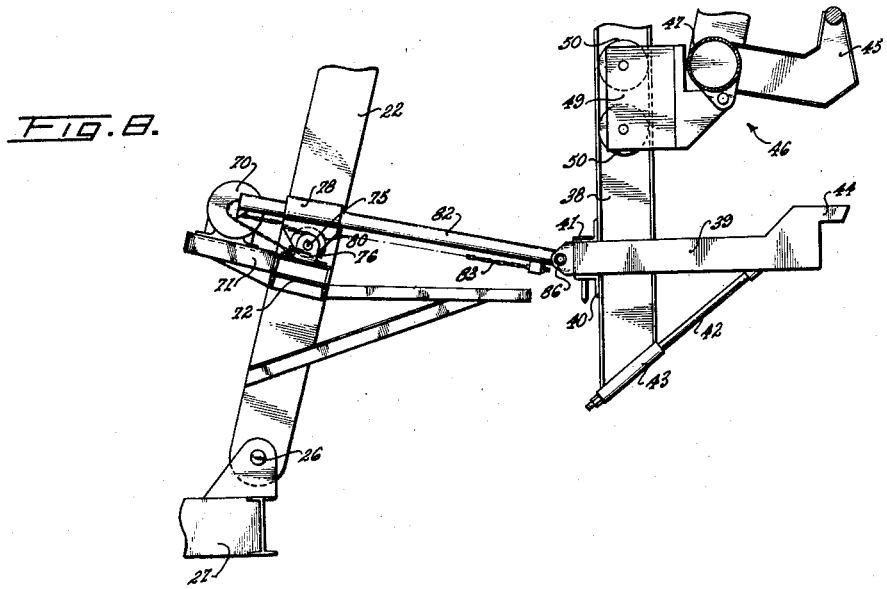
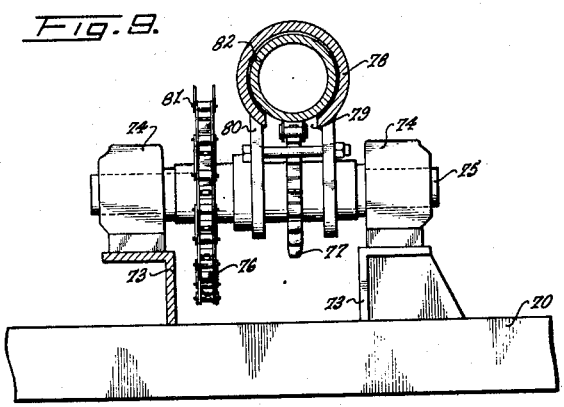
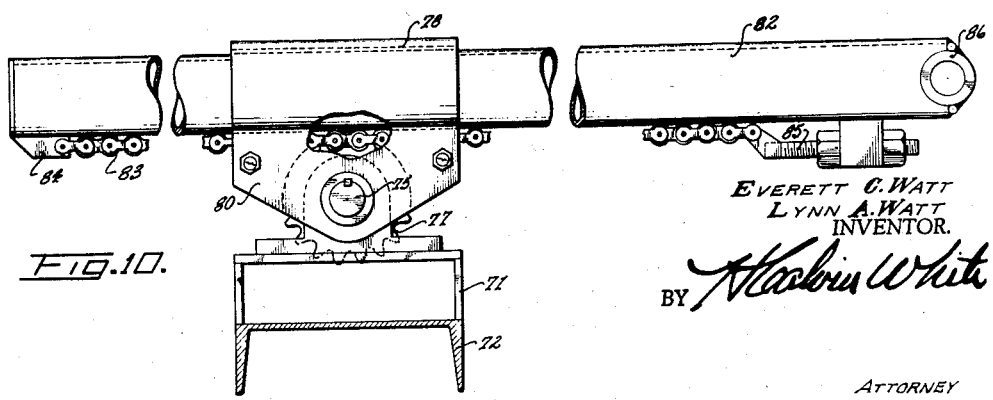
EVERETT C. WATT
LYNN A. WATT
INVENTOR.
BY
ATTORNEY : 2,936,913
Patented May 17, 1960

2,936,913

APPARATUS FOR UNLOADING SUGAR CANE AND THE LIKE

Everett C. Watt and Lynn A. Watt, both of Hilo, Hawaii

Application November 19, 1957, Serial No. 697,374

11 Claims. (Cl. 214—44)

This invention has to do generally with new and improved apparatus for use in the unloading of materials, typically and significantly sugar cane, from vehicles such as trucks or trailers having open top bodies into which the contents are filled onto a flexible means having, for example, net-like characteristics enabling it to in effect line the body and have at one side thereof a free edge so that by elevation of the flexible means at its free edge, the contents of the vehicle may be dumped over the opposite side of the body. As illustrative, the invention will be described with reference to apparatus for unloading sugar cane from trailer bodies into which the cane is filled onto a "net," which in the broad contemplation of the invention may be any flexible means or assemblage of strands capable of being accommodated within the body to receive the load and capable of elevation at one side of the body to spill out the contents. As will appear, in actual practice, the net may consist of parallel strands or cables secured to the body at the dump side and having their opposite ends connected to a common member such as a hook plate adapted to overlie and rest upon the opposite top edge of the body.

The invention has for its general object to overcome various disadvantages and limitations in the practices and equipment heretofore employed for unloading of the cane. Generally the practice has been to employ a suitable hoist capable of elevating the free side of the net in a manner causing the cane to be dumped over the opposite side of the body as the net is progressively raised, and to resort to make-shift and generally unsatisfactory means for attempting to stabilize the vehicle or the body against the offset imposition of load as the cane is being dumped. This load condition results from concentration of the bulk of the cane weight at or on the dump side of the body to an extent that the vehicle may actually tip over unless supported against the unbalanced load. In the past it has been the practice to resort to such expedients as unloading the vehicle close to a barrier or wall at the dump side so that tilting of the body is arrested at the point of engagement with the wall. This and other like expedients have the apparent disadvantages of requiring specially equipped unloading stations and of lacking the more desirable effect of a positive hold-down means engageable with the vehicle or its body in a pre-determinable definite relation that will assure against any excessive tilting and strain on the vehicle.

The invention has for its further and more specific object the provision of a unitary and self-contained unloading apparatus capable of serving the dual functions of hoisting the net and holding the vehicle against lateral tilting under the influence of the load being dumped. In accomplishment of this object we provide in a unitary assembly, a hoisting mechanism adaptable for releasably engaging and elevating the hook plate at the free side of the net, and associated means for engaging the corresponding side of the body in a hold-down relation, i.e. so that the body is positively blocked against upward displacement or tilting under the offset load. Preferably the hoisting and hold-down mechanisms are cooperatively related so that actuation of the hold-down means into engagement with the vehicle body occurs automatically in response to elevation of the hoist and in a sequential relation causing the hold-down to be brought into operative position before the occurrence of any consequential tilting of the body.

Structurally the invention contemplates an improved unloading apparatus comprising a frame structure adapted to be positioned opposite and in spaced relation to that side of the body supporting the net hook plate, the frame structure serving to mount a hoist mechanism actuated by an appropriate arrangement of cable and winding drum so that a hoist hook is engageable with the net hook plate and its travel is guided vertically along the frame structure. The latter also mounts the hold-down mechanism below the hoist hook and in a manner such that raising and lowering of the hoist moves the hold-down toward and away from the side of the body and thus into and out of tilt-blocking engagement therewith.

Among its more specific objects, the invention provides a novel mounting for the hoist and hold-down device in the form of an elongated beam having at its upper end a hinge connection with an inclined boom portion of the frame structure, the beam thus being swingable toward and away from the vehicle and serving the dual functions of a guide for the hoist, at least through the lower extent of its vertical travel, and has a carrier for a hold-down arm or finger projectable into overlying engagement with a so-called pocket or shoulder on the vehicle body. As will later appear, the cooperative relationship between the parts is such that the previously described actuation of the hold-down means in response to vertical travel of the hoist occurs by rendering the hinged beam responsive in its swinging movement to travel of the hoist.

The above-mentioned features and objects of the invention, as well as the details of a typical and illustrative embodiment thereof will be understood more fully and to best advantage from the following description of the drawings, in which:

Fig. 1 is a view showing the apparatus in side elevation and in operative relation to a trailer to be unloaded;

Fig. 2 is a fragmentary enlargement showing the net elevating hoist hook lowered and the swing beam for hold-down finger in consequential retractive position;

Fig. 3 is a section as viewed from line 3—3 of Fig. 1 toward the side of the trailer;

Fig. 4 is a section taken on line 4—4 of Fig. 1;

Fig. 5 is a fragmentary elevation as viewed from line 5—5 of Fig. 1;

Fig. 6 is a fragmentary elevation showing the net hook plate as viewed from line 6—6 of Fig. 1;

Fig. 7 is a fragmentary enlargement of one of the retraction cable sheaves and hook bar travel blocks as they appear in Fig. 4;

Fig. 8 is a fragmentary side elevation showing a variational form of swing beam actuating mechanism;

Fig. 9 is an enlargement of the reciprocally powered beam actuating arm shown in Fig. 8; and Fig. 10 is a section on line 10—10 of Fig. 9.

Referring first to Fig. 1, we have illustrated at 10 a trailer of a form customarily used for transporting sugar cane and comprising an open top body 11 at one side 12 of which is attached a net generally indicated at 13 and which may consist of a series of generally parallel strands or cables 14 attached at their free ends to an elongated hook plate 15 which is adapted to overlie and engage the top edge of the opposite side 16 of the body as shown in the solid line position of Fig. 1. As will be understood, in this condition the net generally lines the body so that the cane, not shown, is loaded into the body on top of the net. The sides of the body are formed to present one or more surfaces or shoulders engageable by the latter described hold-down means to positively block lateral tilting of the body as the load is being dumped. As illustrative, the body is shown to have recesses and pockets at 17 defined at their bottoms by horizontal members 18 presenting upwardly facing shoulders or surfaces 19.

The unloading apparatus, generally indicated at 20 is shown to comprise an inclined vertically extending boom 21 consisting of a pair of arms formed by spaced parallel lower I-beams 22 welded to upper offset similar beams 24 interconnected at their upper ends by a cross member 23, see Fig. 5. The beams 22 have their lower ends hinged at 26 to one side of a carriage 27 which may be mounted on wheels 28 for travel along the tracks 29. The inclination of the boom may be adjusted by cables 30 running from connections with beams 24 to anchor attachments with the carriage frame structure 31. The beam assemblies are shown to be reinforced against bending under the hoist load by appropriate bracing at 32. At its top corners the boom structure carries a pair of sheaves 33 over which pass cables 34 wound on winding drums 35 powered by motor 36 which as will be understood without necessity for specific showings, has controls for reverse operation of the winding drums in raising and lowering the latter described hoist.

Hinged at 37 to the lower ends of beams 24 is a pair of similarly dimensioned and generally alignable I-beams 38 which we term the swing beams by reason of their capacity for swinging movement toward and away from the trailer 10. Carried by the lower ends of the swing beams is a pair of arms 39 received and removably retained in brackets 40 by pins 41. Each arm is reinforced by a brace rod 42 removably received within a tubular socket 43. At its outer extremity each arm has a hold-down finger 44 which in the projected position of the arm shown in Fig. 1 overlies and engages shoulder 19 on the trailer body.

The net hook plate 15 is engageable by a plurality of hooks 45 carried by a traveling hoist structure generally indicated at 46 and comprising a bar 47 from which the hooks project, hinged at 48 to a carrier 49 having wheels 50 which travel in the channel defined by the outer side of the swing beam 38 and also the I-beam 24. Attached to the bar 47 is a pair of arms 51 and extensions 52 which carry sheave wheels 53. Brackets 54 at the top of the frame carry an additional pair of sheave wheels 55. As shown in Fig. 1, the cables 34 running over the crown sheaves 33 extend downwardly about the traveling sheaves 53, thence upwardly over sheaves 55 and thence downwardly to attachments at 57 with the arm extensions 52.

Referring particularly to Figs. 2 and 4, each swing beam 38 is rendered responsive in its projection and retraction of the hold-down finger 44 to vertical travel of the hoist, by the simple device of a sheave wheel 60 mounted on and outwardly (to provide clearance for the travel block 49) from the side of the beam 38, and a cable 61 running from its anchor at 62 with the beam 22 over the sheave and downwardly to a connection at 63 with a slide bar 64 (see Fig. 4) slidable vertically along the swing beams. As will appear, slide bar 64 is actuated in its sliding movement by engagement with the travel block 49 to exert such pull and release of pull on the cable 61 as will cause outward and retractive movements of the swing beams.

In considering the operation of the equipment, it may be assumed that the trailer 10 is brought alongside the unloading unit in the position and relationship shown in Figs. 1 and 3. Initially the hook bar travel block 49 may be in the lowered position with consequential retraction of the hold-down arm 39, all as shown by the broken lines in Fig. 1. With the hold-down arms exposed directly opposite the pockets 17 in the side of the trailer, winding drums 35 are actuated to elevate the traveling pulleys 53 and attached arm 51 and traveling block 49, thus relieving the block load on the slide bar 64 and permitting the beam 38 to swing by gravity to the substantially vertical solid line position of Fig. 1 in which the fingers 44 are brought into overlying and hold-down relation with shoulders 19 on the trailer body. During initial upward travel along the swing beam of blocks 49, hooks 45 are swung beneath the net hook plate 15 so as to come into engagement therewith upon continued upward travel from the Fig. 1 position. As the hoist continues to be elevated, blocks 49 travel upwardly at the inside of the retract cable sheaves 60 and continue after traveling the full upper extent of the swing beams 38 into the channels formed by the I-beams 24, ultimately to a position as indicated by the broken lines at 49a. During the up travel of the hoist the net 14 is elevated and distended as shown in Fig. 1, to progressively dump the cane load over the side of the trailer body while the latter is stabilized and held against tilting under the offset cane load, by the fingers 44.

After the load is dumped, the traveling parts of the hoist are permitted to lower by gravity so that the blocks 49 travel down the channels of beams 24 and 38, and the net 14 is returned into the trailer. As they lower along the swing beams 38, blocks 49 engage the slide bar 64, forcing it downward and consequently applying tension to cable 61 which results in retraction of the hold-down arms 39 from the trailer to the described broken line starting position of Fig. 1.

Figs. 8 to 10 illustrate a variational feature of the invention wherein provision is made for positively advancing and retracting the hold-down arm by suitable drive mounted on the frame structure. Corresponding numerals have been used to indicate parts in Figs. 8 to 10 the same as those previously described.

In Fig. 8, a motor 70 is shown to be mounted on a platform or base 71 which in turn is supported on a frame member 72 extending between the beams 22, the latter being supported, as before from the carriage 27 through the hinge connections 26. As best shown in Figs. 9 and 10, the base 70 also mounts on supports 73 a pair of bearings 74 within which is journaled shaft 75 to which is keyed sprockets 76 and 77. Also carried by the shaft is a guide yoke comprising the tube 78 having a bottom through slot 79 and a pair of integral arms 80 which pivot on the shaft. Motor 70 reversably drives the sprocket 76 by way of chain 81, thus imparting reverse rotation to sprocket 77 for reciprocation of rod 82 extending through and guided within the slotted tube 78. The rod 82 carries at its underside a chain 83 having one end anchored at 84 and connected at its opposite end to a bolt 85 which may be adjusted to properly tension the chain so that the latter serves essentially as rack teeth on the rod. Chain 83 being meshed with the sprocket 77, reverse rotations of the sprocket impart reciprocating motion to the rod 82. The latter has a terminal pivot rod connection at 86 with the hold-down arms 39.

With the equipment brought into the Fig. 1 relation to the trailer 10, motor 70 may be energized to project the rod 82 so as to swing beam 38 and the fingers 44 into hold-down engagement with the trailer body. Thereafter, as the completion of the unloading, motor 70 may be reversely operated to retract the interconnected rod and swing beam assembly as to the broken line position of Fig. 1.

It will be understood that the drawings are to be regarded as illustrative of the invention in a typical though preferred embodiment, and that various changes and modifications may be made without departure from the scope of the invention as expressed in the appended claims.

We claim:
1. Apparatus for us in unloading sugar cane or the like from a vehicle having an open top body containing a net on which the cane is filled into the body and which upon elevation of a free edge at a first side of the body causes the cane to be dumped over the opposite side thereof; said apparatus comprising an upstanding frame structure adapted to be positioned opposite said first side of the body and to extend above the height of the body, upwardly and downwardly movable hoisting means carried by said structure and operable to engage and elevate the corresponding side of the net, hold-down means carried by said frame structure below said hoisting means and releasably engageable with said vehicle to hold said first side of the body against upward displacement under the influence of the cane load being dumped, means mounting said hold-down means for movement laterally of said frame structure into and out of said engagement with the vehicle, and a vertically extending member pivotally mounted for swinging movement on said frame structure and carrying said hold-down means below the pivotal mounting.

2. Apparatus for use in unloading sugar cane or the like from a vehicle having an open top body containing a net on which the cane is filled into the body and which upon elevation of a free edge at a first side of the body causes the cane to be dumped over the opposite side thereof; said apparatus comprising an upstanding frame structure including an inclined boom adapted to be positioned at and inclined upwardly toward said first side of the body, a beam hinged at its upper end to said boom at an intermediate location along the boom and at an elevation higher than the vehicle for swinging movement relative thereto, hoisting means movable along said beam and operable to engage and elevate the net, said hoisting means being movable toward and away from net-engaging positions at the side of the body by swinging of the beam toward and away from the body, and means guiding said hoisting means for movement along the boom above said beam.

3. Apparatus for use in unloading sugar cane or the like from a vehicle having an open top body containing a net on which the cane is filled into the body and which upon elevation of a free edge at a first side of the body causes the cane to be dumped over the opposite side thereof; said apparatus comprising an upstanding frame structure including an inclined boom adapted to be positioned at and inclined upwardly toward said first side of the body, a beam hinged at its upper end to said boom at a location intermedaite the top and bottom of the boom and at an elevation higher than said body for swinging movement relative thereto, hold-down means mounted by said beam and releasably engageable with said first side of the body to hold it against upward displacement under the influence of the cane load being dumped, and net elevating means carried by said boom and movable above said beam.

4. Apparatus as defined by claim 2, including also hold-down means mounted by said beam and releasably engageable with said first side of the body to hold it against upward displacement under the influence of the cane load being dumped.

5. Apparatus as defined by claim 2, in which said hoisting means comprises a net engaging hook, a wheeled carrier for the hook mounted to travel along said beam, and cable means for raising and lowering the carrier.

6. Apparatus as defined by claim 5, in which said carrier is movable upwardly beyond said beam and along the side of said inclined boom.

7. Apparatus as defined by claim 2, including also means for swinging said beam in response to movement of said hoisting means.

8. Apparatus as defined by claim 2, including also a slide member on said beam and a cable interconnecting said slide member with the boom, said slide member being actuable by engagement with said hoisting means to produce swinging movement of the beam.

9. Apparatus as defined by claim 2, in which said hoisting means includes a wheeled lifting hook carrier movable upwardly on and above the beam hinge, cable means for lifting the carrier, a hold-down member carried by said means and engageable with the side of the body, and means for swinging said beam toward and away from the body in response to the travel of said carrier.

10. Apparatus as defined by claim 2, comprising also a motor operatively connected to said beam to actuate it in its swinging movements.

11. Apparatus as defined by claim 4, comprising also a motor carried by said frame structure and operatively connected to said beam to actuate it in its swinging movement.

References Cited in the file of this patent

UNITED STATES PATENTS

| | | |
|---|---|---|
| 556,456 | Bouillotte | Mar. 17, 1896 |
| 1,228,659 | Garson | June 5, 1917 |
| 1,624,323 | Flowers | Apr. 12, 1927 |
| 1,777,476 | Remde | Oct. 7, 1930 |
| 2,558,388 | Richardson | June 26, 1951 |
| 2,646,182 | Maas | July 21, 1953 |
| 2,827,772 | Taylor et al. | Mar. 25, 1958 |

FOREIGN PATENTS

| | | |
|---|---|---|
| 494,215 | Italy | May 18, 1954 |
| 696,524 | France | Dec. 31, 1930 |